(12) United States Patent
Kim et al.

(10) Patent No.: US 7,571,309 B2
(45) Date of Patent: Aug. 4, 2009

(54) METHOD AND APPARATUS FOR PROVIDING SECURITY MECHANISM GUARANTEEING TRANSPARENCY AT TRANSPORT LAYER

(75) Inventors: Geon Woo Kim, Daejeon (KR); Sun Hee Lim, Kyungki-do (KR); Sang Su Lee, Daejeon (KR); Ki Hyun Kim, Daejeon (KR); Jeong Nyeo Kim, Daejeon (KR); Jong Soo Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 785 days.

(21) Appl. No.: 11/103,510

(22) Filed: Apr. 12, 2005

(65) Prior Publication Data

US 2006/0095758 A1 May 4, 2006

(30) Foreign Application Priority Data

Nov. 4, 2004 (KR) .................. 10-2004-0089167

(51) Int. Cl.
*H04L 9/00* (2006.01)
(52) U.S. Cl. .................. 713/152; 713/151; 713/150
(58) Field of Classification Search .................. 713/152, 713/151, 150
See application file for complete search history.

(56) References Cited

FOREIGN PATENT DOCUMENTS

KR 102003005567 7/2003

OTHER PUBLICATIONS

Key recovery in IPSec for improving robustness Yoon-Jung Rhee; Chang-Won Choi; Tae-Woo Kim; Tai-Yun Kim; Info-tech and Infonet, 2001. Proceedings. ICII 2001—Beijing. 2001 International Conferences on vol. 5, Oct. 29-Nov. 1, 2001 pp. 72-77 vol. 5.*
A Thin Security Layer Protocol over IP Protocol on TCP/IP Suite for Security Enhancement Al-Jarrah, M.; Tamimi, A.-K.R.; Innovations in Information Technology, 2006 Nov. 2006 pp. 1-5.*
Transport layer security: how much does it really cost? Apostolopoulos, G.; Peris, V.; Saha, D.; INFOCOM '99. Eighteenth Annual Joint Conference of the IEEE Computer and Communications Societies. Proceedings. IEEE vol. 2, Mar. 21-25, 1999 pp. 717-725 vol. 2.*
Euiseok Nahm, et al.; "Software Implementation of a Secure Socket Layer (SSL) Accelerator Based on Kernel Thread"; IEICE Trans. Inf. & Syst., vol. E87-D, No. 1; Jan. 2004; pp. 244-245.

* cited by examiner

*Primary Examiner*—David Y Jung
(74) *Attorney, Agent, or Firm*—Lowe Hauptman Ham & Berner, LLP

(57) ABSTRACT

Provided are a method and apparatus for providing a security mechanism guaranteeing transparency at a transport layer. The method includes: receiving a data packet from an application program, and searching key information corresponding to the data packet in key information database; determining whether to request a key exchange module of an application layer for a new key negotiation according to a result obtained by searching key information; and performing encrypting/decrypting based on key information when the key exchange module stores key negotiation information obtained by the new key negotiation in a kernel. The apparatus encrypts/decrypts the data packet at the transport layer of the kernel, thereby providing the application program with security transparency, effectively controlling and making it easily expansible.

10 Claims, 5 Drawing Sheets

METHOD AND APPARATUS FOR PROVIDING SECURITY MECHANISM GUARANTEEING TRANSPARENCY AT TRANSPORT LAYER

BACKGROUND OF THE INVENTION

This application claims the benefit of Korean Patent Application No. 10-2004-0089167, filed on Nov. 4, 2004, in the Korean Intellectual Property Office, the disclosure of which is incorporated herein in its entirety by reference.

1. Field of the Invention

The present invention relates to a method and apparatus for providing a security mechanism at a transport layer, and more particularly, to a method and apparatus for providing a security mechanism guaranteeing transparency at a transport layer that provides an application program with security transparency and effectively controls the security transparency by performing encrypting/decrypting at the transport layer of a kernel that transmits/receives all kinds of data.

2. Description of the Related Art

A secure socket layer (SSL) protocol is separately used for an application program such as a web browser in order to protect a transport layer. An SSL server and SSL client installed in each node in a network environment having a server and a client perform encrypting/decrypting and key negotiation between an application layer and the transport layer using an open SSL library, which guarantees a secure communication channel between the server and the client. A transport layer security (TLS) protocol version 1.0 is the latest industry standard SSL protocol.

However, since an application program other than a web-based application needs a separate library in order to provide transport layer-based network security service, it is necessary to correct all existing application programs, and is difficult to control them as well.

A TLS protocol that provides all application programs with a common function and route at the transport layer makes it possible to construct a secure communication channel without any correction of all of the existing application programs, to guarantee perfect security transparency, and to effectively control security transparency at a kernel level.

FIG. 1 is a block diagram of an encrypting/decrypting module and a key exchange module for protecting data at the transport layer. Referring to FIG. 1, in a conventional security mechanism at the transport layer, an encrypting/decrypting module 111 and a key exchange module 112 operate in a socket interface interposed between the application layer and the transport layer below.

First, a manager corrects an application program wishing to use security service, and provides a network having the socket interface that uses the open SSL library. Then, when the application program transmits a user data packet, a TLS module of the socket interface checks the user data packet, the key exchange module 112 exchanges the user data packet with a key exchange module of an object node to negotiate new key information, and stores new key information. Thereafter, the encrypting/decrypting module 111 encrypts the user data packet based on key information, and transmits the encrypted packet.

The convention security mechanism must separately execute all of the application programs in every socket interface.

Referring to FIG. 1, since a separate socket interface is used to execute each of application programs 110, the TLS module has problems of transparency, expansibility, etc., and causes degradation of performance.

SUMMARY OF THE INVENTION

The present invention provides a method and apparatus for providing security mechanism guaranteeing transparency at a transport layer that provides an application program with security transparency and effectively controls the security transparency by providing security service at the transport layer of a network stack.

According to an aspect of the present invention, there is provided a method of providing a security mechanism guaranteeing transparency at a transport layer, comprising: receiving a data packet from an application program, and searching key information corresponding to the data packet in key information database; determining whether to request a key exchange module of an application layer for a new key negotiation according to a result obtained by searching key information; and performing encrypting/decrypting based on key information when the key exchange module stores key negotiation information obtained by the new key negotiation in a kernel.

According to another aspect of the present invention, there is provided an apparatus for providing a security mechanism guaranteeing transparency at a transport layer, comprising: a key information search unit receiving a data packet transmitted from an application program to a TCP/UDP protocol, searching key information corresponding to the data packet in a key database, and determining whether the key database includes key information; a key request determiner requesting for a new key, and determining that an encrypting/decrypting processor is on standby if the key database does not include key information corresponding to the data packet; and an encrypting/decrypting unit encrypting/decrypting the data packet based on key information output by the key request determiner, and outputting encrypted/decrypted data packet.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings.

Figure 1:
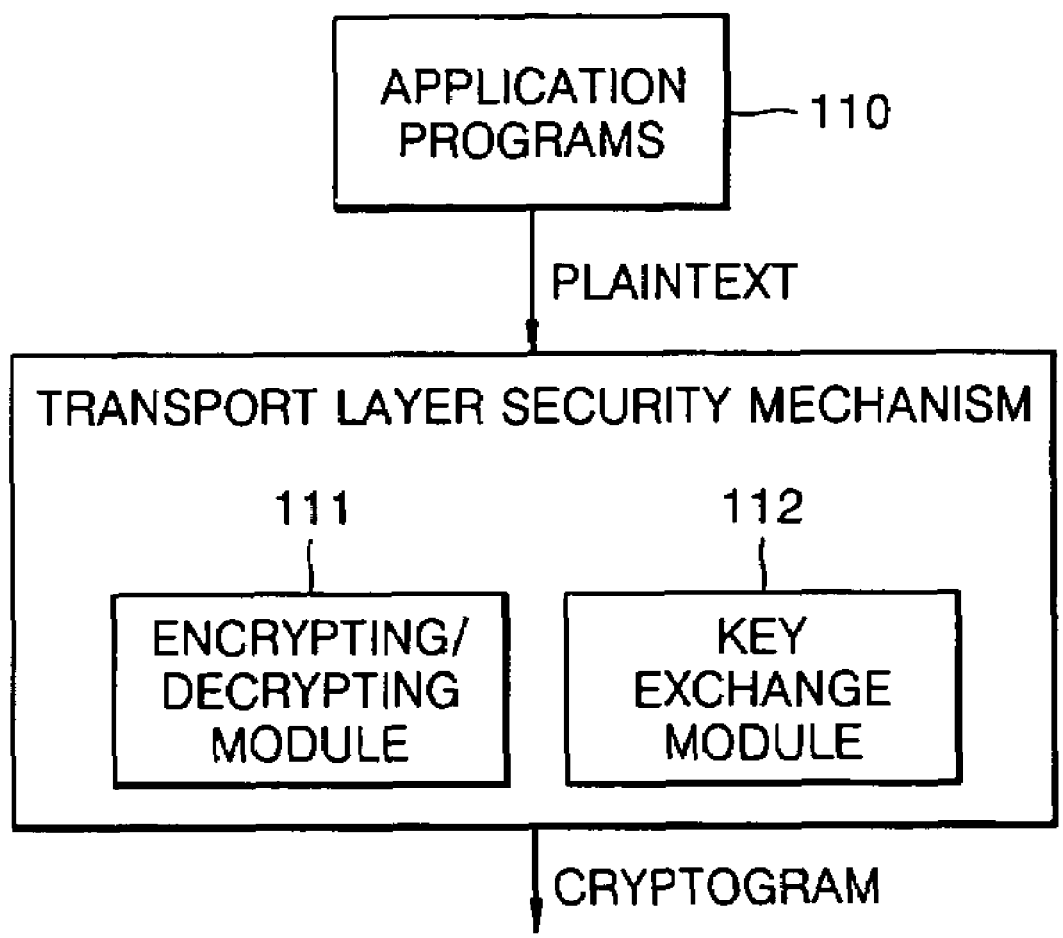
FIG. 1 is a block diagram of an encrypting/decrypting module and a key exchange module for protecting data at a transport layer.
Figure 2:
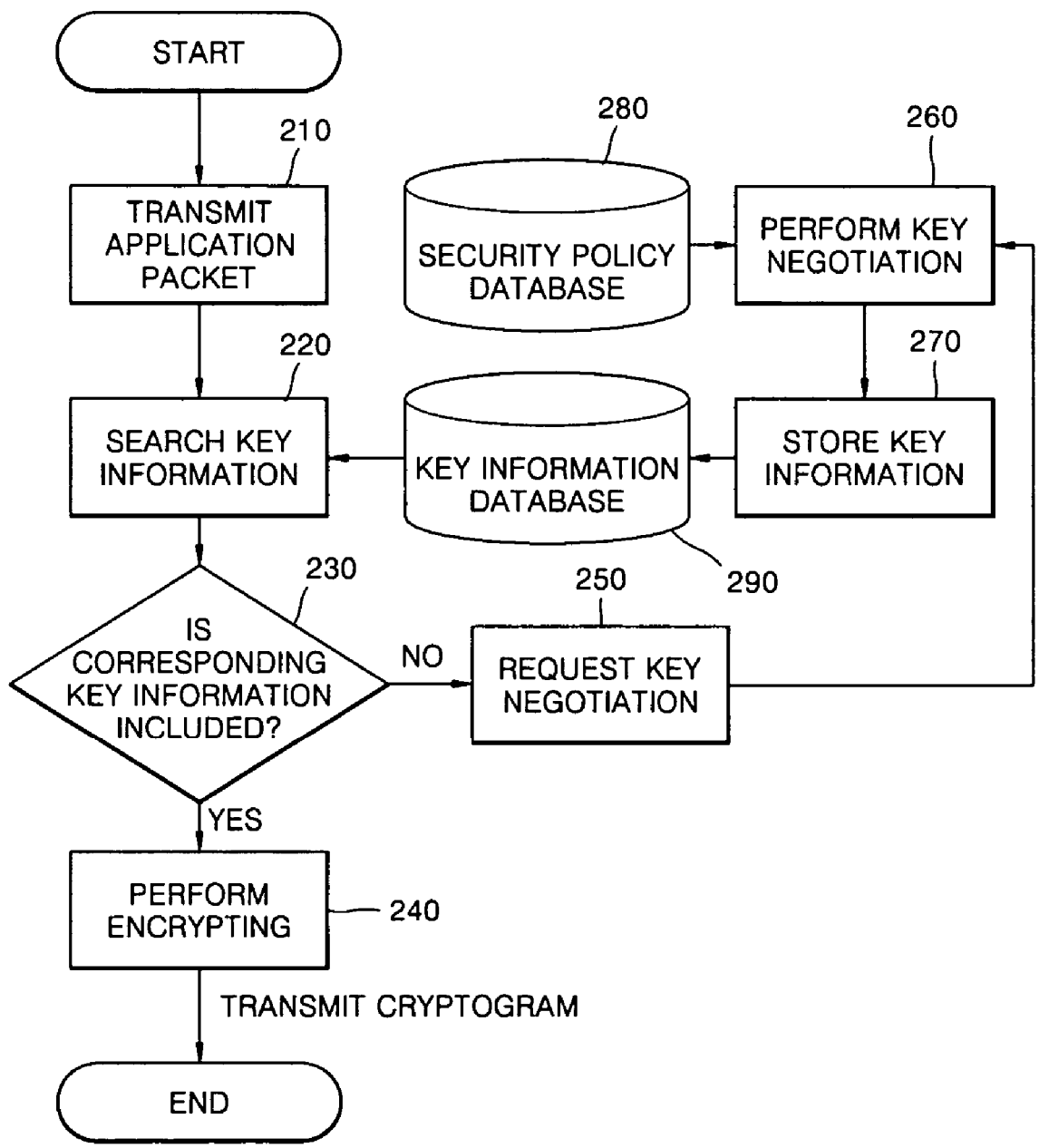
FIG. 2 is a flow chart of user data packet transmission using a method of providing a security mechanism at a transport layer guaranteeing transparency according to an embodiment of the present invention.
Figure 3:
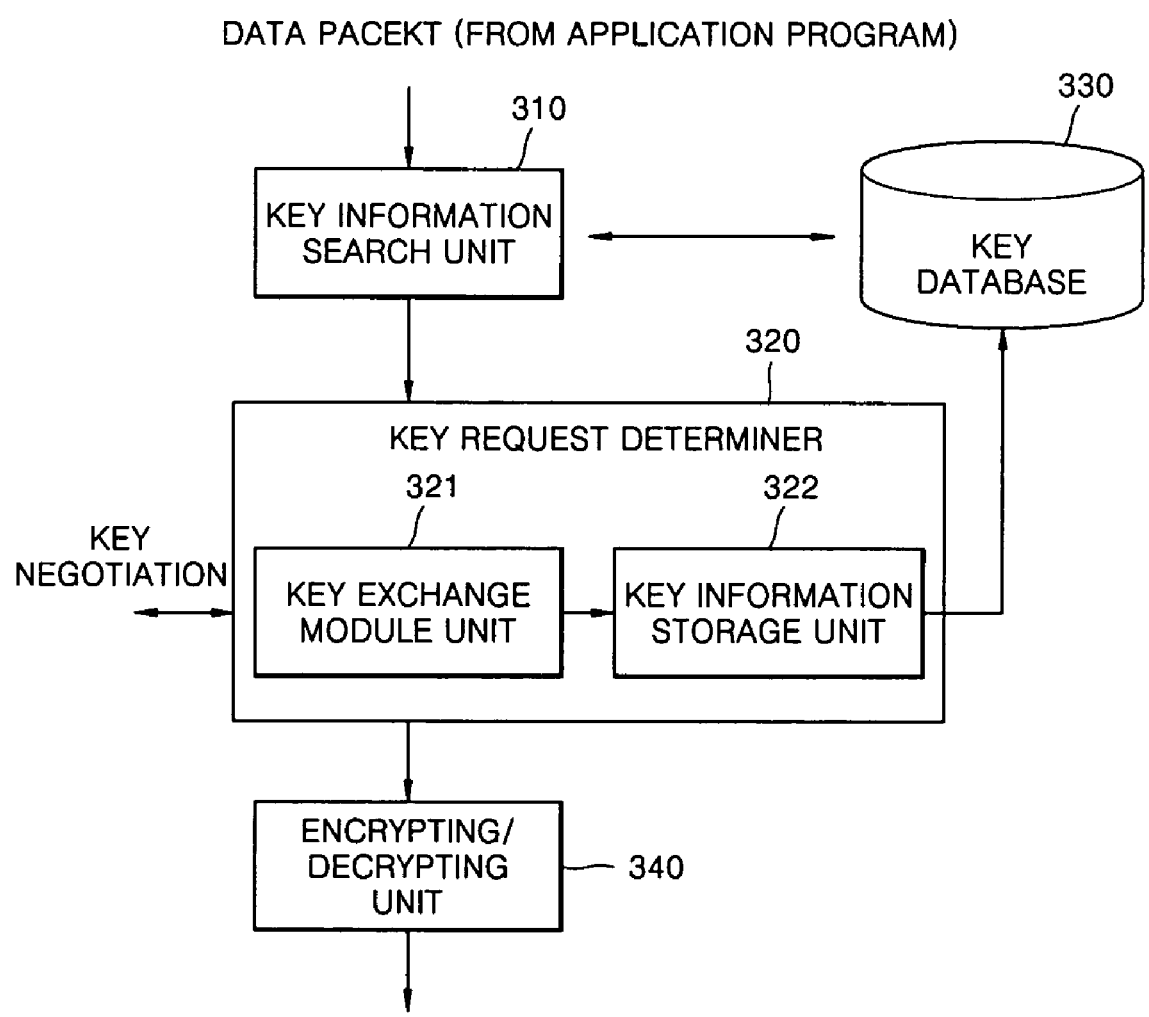
FIG. 3 is a block diagram of an apparatus for providing a security mechanism at a transport layer guaranteeing transparency according to an embodiment of the present invention.
Figure 4:
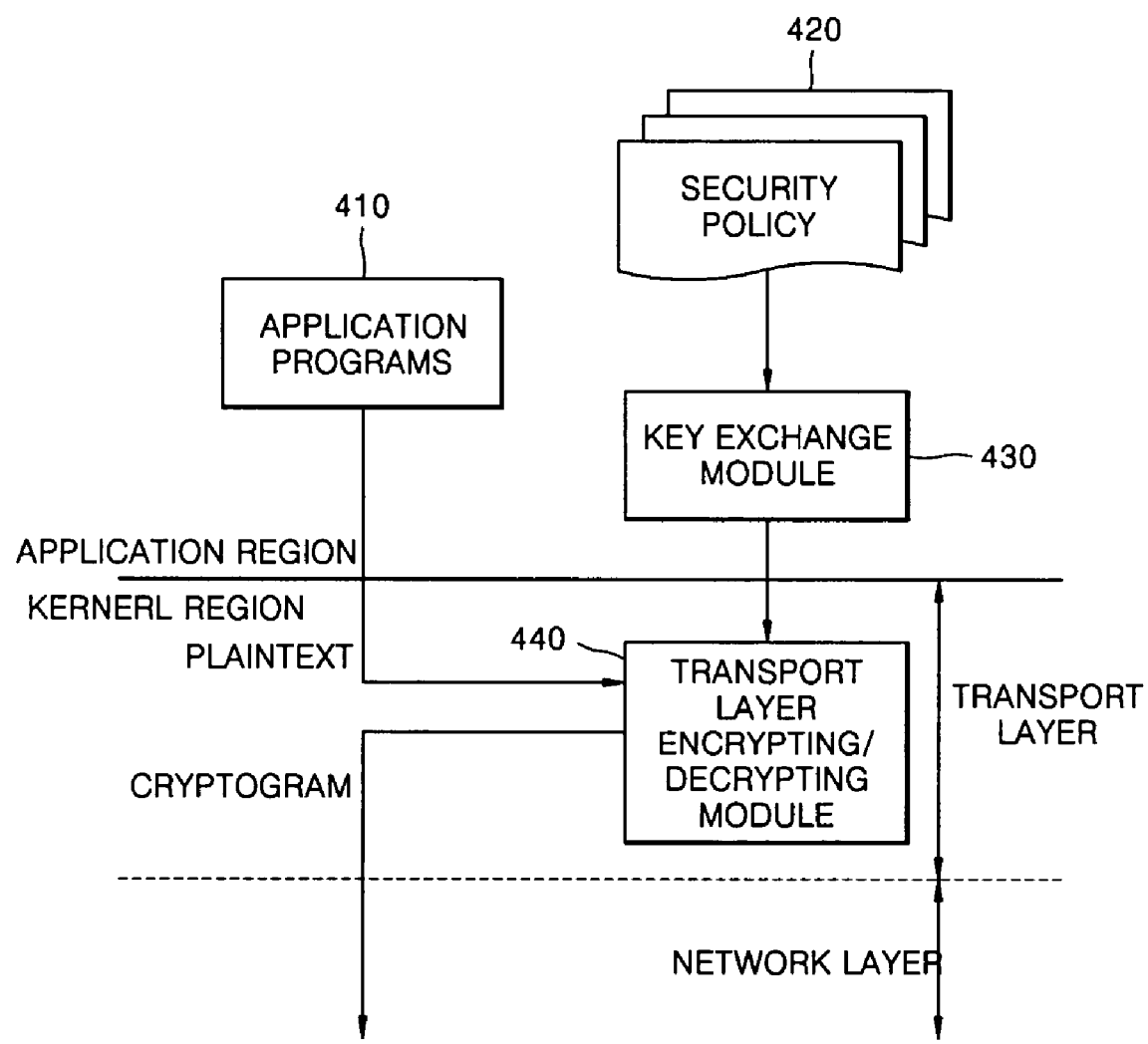
FIG. 4 is a block diagram of operations performed by an encrypting/decrypting module and a key exchange module for providing transparency in order to provide a security mechanism at the transport layer.

FIG. 2 is a flow chart of user data packet transmission using a method of providing a security mechanism at a transport layer guaranteeing transparency according to an embodiment of the present invention. FIG. 3 is a block diagram of an apparatus for providing a security mechanism at a transport layer guaranteeing transparency according to an embodiment of the present invention. FIG. 4 is a block diagram of operations performed by an encrypting/decrypting module and a key exchange module for providing transparency in order to provide a security mechanism at a transport layer.

Referring to FIG. 2, an application program transmits a data packet in Operation 210. A transport layer of a kernel searches key information corresponding to the data packet in a key information database 290 in Operation 220, and determines whether the key information database 290 includes key information in Operation 230. If the key information database 290 includes previously negotiated key information, an encrypting/decrypting unit encrypts the data packet based on previously negotiated key information, and transmits encrypted data packet to a network layer in Operation 240. If the key information database 290 does not include previously negotiated key information, a key request determiner requests a key exchange module of an application level for a new key negotiation, and is on standby in Operation 250. The key exchange module performs the key negotiation based on information of security policy database in Operation 260, stores key negotiation information in the key information database 290 of the kernel in Operation 270. Based on stored key negotiation information, the encrypting/decrypting unit encodes the data packet, and transmits encrypted data packet to the network layer in Operation 240.

FIG. 4 shows that an encrypting/decrypting module 440 of the transport layer provides real time encrypting/decrypting security service using a key exchange module 430 and a security policy 420 of the application layer.

The encrypting/decrypting module 440 of the transport layer receives a plaintext to be encrypted from application programs 410 of an application region, encrypts the plaintext based on key information received from the key exchange module 430 to creates a cryptogram, and transmits the cryptogram to the network layer lower than the transport layer, thereby performing encrypting/decrypting at the transport layer.

Figure 5:
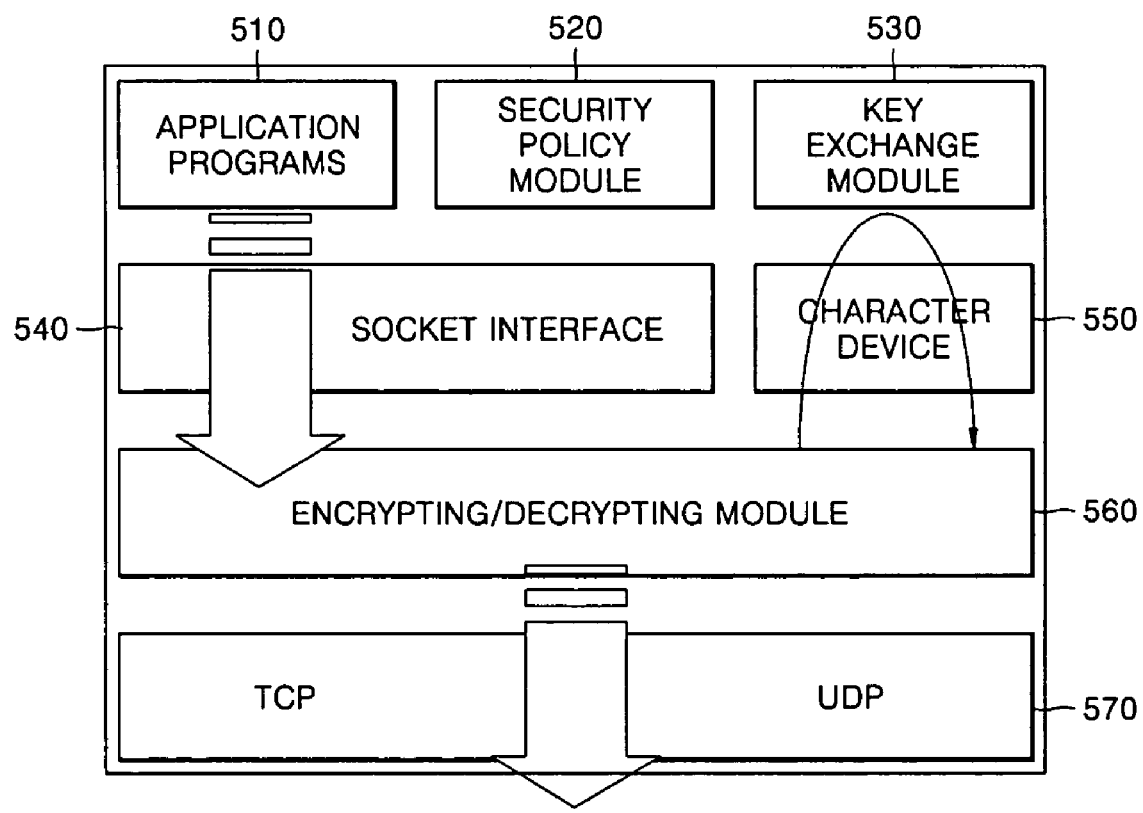
FIG. 5 is a block diagram of operations performed between a transport layer encrypting/decrypting and the key exchange module of security mechanism at the transport layer guaranteeing transparency.

FIG. 5 is a block diagram of operations performed between a transport layer encrypting/decrypting module and the key exchange module of security mechanism at the transport layer guaranteeing transparency. Referring to FIG. 5, the transport layer encrypting/decrypting module 560 is located at the top of a TCP/UDP protocol 570, encrypts the plaintext, and transmits the cryptogram to the TCP/UDP protocol 570 when transmitting the cryptogram. The transport layer encrypting/decrypting module 560 decrypts the cryptogram received from the TCP/UDP protocol 570, and transmits a plaintext (a decrypted text) to application programs 510 when receiving the plaintext. The transport layer encrypting/decrypting module 560 and a key exchange module 530 of the application level transmit data to each other using a character device 550, and perform mutual synchronization.

Referring to FIG. 3, a key information search unit 310 receives a data packet transmitted by the application program of the application layer. The key information search unit 310 searches key information corresponding to the data packet in key database 330, and determines whether the key database 330 includes key information. If the key database 330 includes previously negotiated key information, an encrypting/decrypting unit 340 encrypts the data packet based on previously negotiated key information, and transmits encrypted data packet to the network layer. If the key database 330 does not include previously negotiated key information, it is necessary to update a new key. In this case, a key request determiner 320 requests a key exchange module unit 321 for a new key negotiation, and is on standby. The key exchange module unit 321 performs the key negotiation based on information of security policy database 280, transmits key negotiation information to a key information storage unit 322 that stores key negotiation information in the key database 330.

The encrypting/decrypting unit 340 performs encrypting/decrypting based on new key negotiation information. To be more specific, the encrypting/decrypting unit 340 at the transport layer receives a plaintext to be encrypted from the application program of the application region, encrypts the plaintext based on key information received from the key database 330 to create a cryptgram, and transmits the cryptogram to the network layer lower than the transport layer, thereby performing encrypting/decrypting at the transport layer.

It is possible for the present invention to be realized on a computer-readable recording medium as a computer-readable code. Computer-readable recording mediums include every kind of recording device that stores computer system-readable data. ROM, RAM, CD-ROM, magnetic tape, floppy disc, optical data storage, etc. are used as a computer-readable recording medium. The computer-readable recording mediums can also be realized in the form of a carrier wave (e.g., transmission through Internet). A computer-readable recording medium is dispersed in a network-connecting computer system, resulting in being stored and executed as a computer-readable code by a dispersion method. It is also possible for a font ROM data structure of the present invention to be realized on a computer-readable recording medium as a computer-readable code.

The security method and security apparatus that guarantee transparency at the transport layer use a transport layer-based security mechanism without separately correcting each source code of all application programs, thereby providing transparency.

It is possible to provide a security infrastructure capable of establishing and carrying out a consistent security policy between two network nodes for performing a secure communication using transport layer security, thereby providing a real time key negotiation protocol.

It is possible to provide various application packets with different security mechanism, thereby easily correcting a security policy.

Encrypting/decrypting at a kernel level makes it possible to reduce time taken to separately encrypt/decrypt each of application programs, thereby reducing degradation of performance.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the present invention is defined not by the detailed description of the invention but by the appended claims, and all differences within the scope of the present invention will be construed as being included in the present invention.

What is claimed is:

1. A computer-implemented method of providing a security mechanism guaranteeing transparency at a transport layer, said method comprising:

receiving a data packet from an application program, and searching key information corresponding to the data packet in a key information database;

determining whether to request a key exchange module of an application layer for a new key negotiation according to a result obtained by searching key information; and performing encrypting/decrypting based on the key information when the key exchange module stores key negotiation information obtained by the new key negotiation in a kernel.

2. The method of claim 1, wherein the searching of key information comprises:

checking the data packet when the data packet is transmitted to a TCP/UDP protocol from a socket interface.

3. The method of claim 1, wherein the determining of whether to request the key exchange module for the new key negotiation comprises:

encrypting the data packet based on searched key information when the result obtained by searching key information is positive; and requesting the key exchange module for a key negotiation when the result is negative.

4. The method of claim 1, wherein the performing of encrypting/decrypting comprises:

exchanging and negotiating key information between the key exchange module and a node;

storing key negotiation information in the kernel, and driving a request processor on standby; and encrypting the data packet based on stored key negotiation information and transmitting encrypted data packet.

5. A computer-based apparatus for providing a security mechanism guaranteeing transparency at a transport layer, said apparatus comprising:

a key information search unit for receiving a data packet transmitted from an application program to a TCP/UDP protocol, searching key information corresponding to the data packet in a key database, and determining whether the key database includes key information;

a key request determiner for requesting for a new key, and determining that an encrypting/decrypting processor is on standby if the key database does not include key information corresponding to the data packet; and an encrypting/decrypting unit for encrypting/decrypting the data packet based on key information output by the key request determiner, and outputting encrypted/decrypted data packet.

6. The apparatus of claim 5, wherein the key request determiner comprises:

a key exchange unit for exchanging and negotiating key information with a node when the key request determiner requests for the new key; and a key information storage unit for storing key negotiation information received from the node in the key database, and driving the encrypting/decrypting processor on standby.

7. The method of claim 3, wherein the determining of whether to request the key exchange module for the new key negotiation further comprises:

performing the key negotiation with the key exchange module based on information in a security policy database.

8. The method of claim 4, wherein the performing of encrypting/decrypting further comprises:

transmitting the data packet using a character device to the key exchange module; and performing mutual synchronization with the key exchange module.

9. The apparatus of claim 6, wherein the key exchange module is adapted to perform key negotiating based on information in a security policy.

10. The apparatus of claim 6, wherein the encrypting/decrypting unit and the key exchange unit are adapted to transmit data to each other using a character device, and perform mutual synchronization.

* * * * *